(12) United States Patent
Toyohara

(10) Patent No.: US 6,236,482 B1
(45) Date of Patent: May 22, 2001

(54) WDM OPTICAL COMMUNICATION SYSTEM

(75) Inventor: Atsushi Toyohara, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/089,092

(22) Filed: Jun. 2, 1998

(30) Foreign Application Priority Data

Jun. 6, 1997 (JP) .................................................... 9-163505

(51) Int. Cl.[7] .................................................... H04B 10/00
(52) U.S. Cl. .......................... 359/134; 359/391; 359/124
(58) Field of Search ........................... 359/110, 124–140, 359/161

(56) References Cited

U.S. PATENT DOCUMENTS

| | | | | |
|---|---|---|---|---|
| 5,392,154 | * | 2/1995 | Chang | 359/341 |
| 5,463,487 | * | 10/1995 | Epworth | 359/124 |
| 5,473,719 | * | 12/1995 | Stone | 385/123 |
| 5,506,774 | * | 4/1996 | Nobe | 364/424.05 |
| 5,764,404 | * | 6/1998 | Yamane | 359/341 |
| 5,796,505 | * | 8/1998 | Ushirozawa | 359/160 |
| 5,805,322 | * | 9/1998 | Tomofuji | 359/177 |
| 5,953,140 | * | 9/1999 | McKiel | 359/124 |
| 6,023,366 | * | 2/2000 | Kinoshita | 359/341 |
| 6,061,173 | * | 5/2000 | Yamane | 359/345 |
| 6,137,605 | * | 10/2000 | Wantanabe | 359/124 |

FOREIGN PATENT DOCUMENTS

| | | |
|---|---|---|
| 59-127003 | 7/1984 | (JP) . |
| 62-245740 | 10/1987 | (JP) . |
| 4-217233 | 8/1992 | (JP) . |
| 7-336327 | 12/1995 | (JP) . |
| 8-125634 | 5/1996 | (JP) . |
| 9-45977 | 2/1997 | (JP) . |

OTHER PUBLICATIONS

Japanese Office Action, dated Jun. 28, 2000, with English language translation of Japanese Examiner's comments.
Japanese Office Action, dated Apr. 5, 2000, with English language translation of Japanese Examiner's comments.

\* cited by examiner

*Primary Examiner*—Jason Chan
*Assistant Examiner*—Agustin Bello
(74) *Attorney, Agent, or Firm*—McGuireWoods LLP

(57) ABSTRACT

It is an object of the invention to provide a WDM optical communication system, which is small-sized and low-priced, and equalizes transmitting optical signal levels. WDM optical signals is amplified by an optical fiber amplifier, split by a multiple splitter, separated by optical band pass filters into several groups of optical signals of different wavelengths, which are separately and collectively amplified by optical fiber amplifiers, adjusted in their levels and multiplexed by a multiple coupler.

7 Claims, 10 Drawing Sheets

FIG. 7
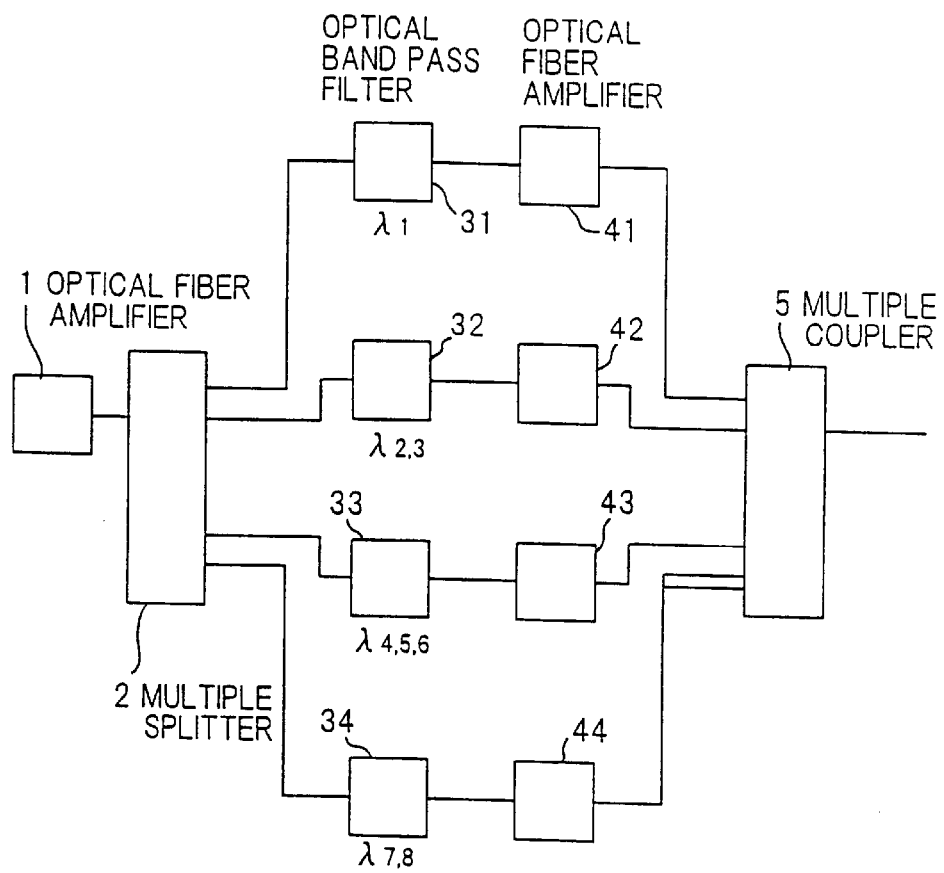
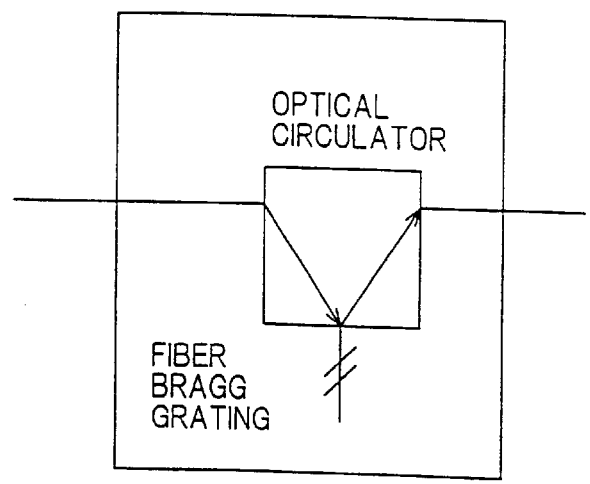
STRUCTURE OF OPTICAL BAND PASS FILTER

WDM OPTICAL COMMUNICATION SYSTEM

The invention relates to a technology of a wavelength division multiplexed. (WDM, hereinafter) optical signal transmission, and especially to a WDM optical communication system. In which plural optical signals are simultaneously transmitted through a single fiber with the same transmission power levels.

BACKGROUND OF THE INVENTION

In recent years, a WDM optical communication system, in which plural optical signals with different wavelengths are multiplexed and transmitted through the same optical transmission line, have being vigorously developed as means for epochally increasing the transmission capacity of the optical transmission line.

In order to extend the transmission distance of the WDM optical communication system, it is indispensable that the levels of the transmitting optical signals are high and equalized, and strenuous efforts have been made to meet the aforementioned requirement. For example, in one of approaches to the subject, optical variable attenuators are respectively connected with the output ports of the signal light sources, and the levels of the optical signals are equalized by adjusting the optical variable attenuators, but the high transmitting powers cannot be achieved. In the other approach, optical fiber amplifiers are respectively connected with the output ports of the signal light sources, and the levels of the optical signals are equalized by adjusting the gains of the optical fiber amplifiers. According to this system, the problems mentioned in the beginning can be solved, but the system is magnified and high-priced. Then, it is extremely desirable to decrease the number of the optical fiber amplifiers.

SUMMARY OF THE INVENTION

Accordingly, it is an object of the invention to provide a WDM optical communication system, which transmits optical signals with equalized levels and is small-sized and low-priced.

According to the feature of the invention, a WDM optical communication syntax comprises:
a first stage optical amplifier for collectively amplifying WDM optical signals,
means for demulitplexing an output of the first stage optical amplifier into plural groups of one or more optical signals,
plural second stage optical amplifiers for respectively amplifying outputs of the means for demulitplexing the output of the first stage optical amplifier, and
means for multiplexing outputs of the plural second stage optical amplifiers.

BRIEF DESCRIPTION OF THE DRAWINGS

The invention will be explained in more detail in conjunction appended drawings, wherein:

FIG. 7 shows a block digram showing another embodiment of the invention.

DESCRIPTION OF THE PREFERRED EMBODIMENT

Before explaining an WDM optical communication system in the preferred embodiments according to the invention, the aforementioned conventional WDM optical communication system will be explained referring to FIGS. 1 to 3.

In the WDM optical communication system, it is very important that the levels of the optical signals are as high as possible and equalized in order to extend a transmission distance as long as possible. In order to equalize the levels of the optical Signals, the method shown in FIGS. 1 to 3 have been conventionally adopted.

Figure 1:
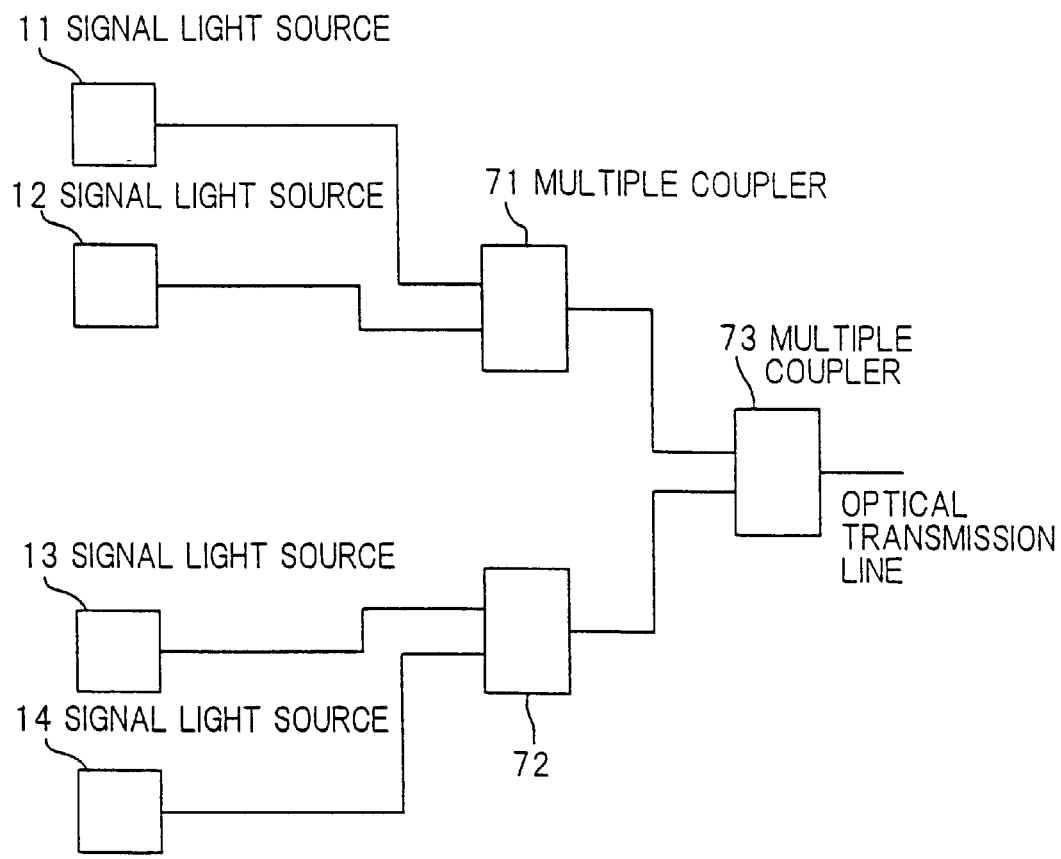
FIG. 1 is an example of conventional WDM optical communication systems.

(1) In a method shown in FIG. 1, the output 2 of the signal light sources 11 to 14 are multiplexed by couplers 71 to 73, and the signal light sources 11 to 14 are respectively adjusted so that the levels of the optical signals are equalized at the output part of the coupler 73.

Figure 2:
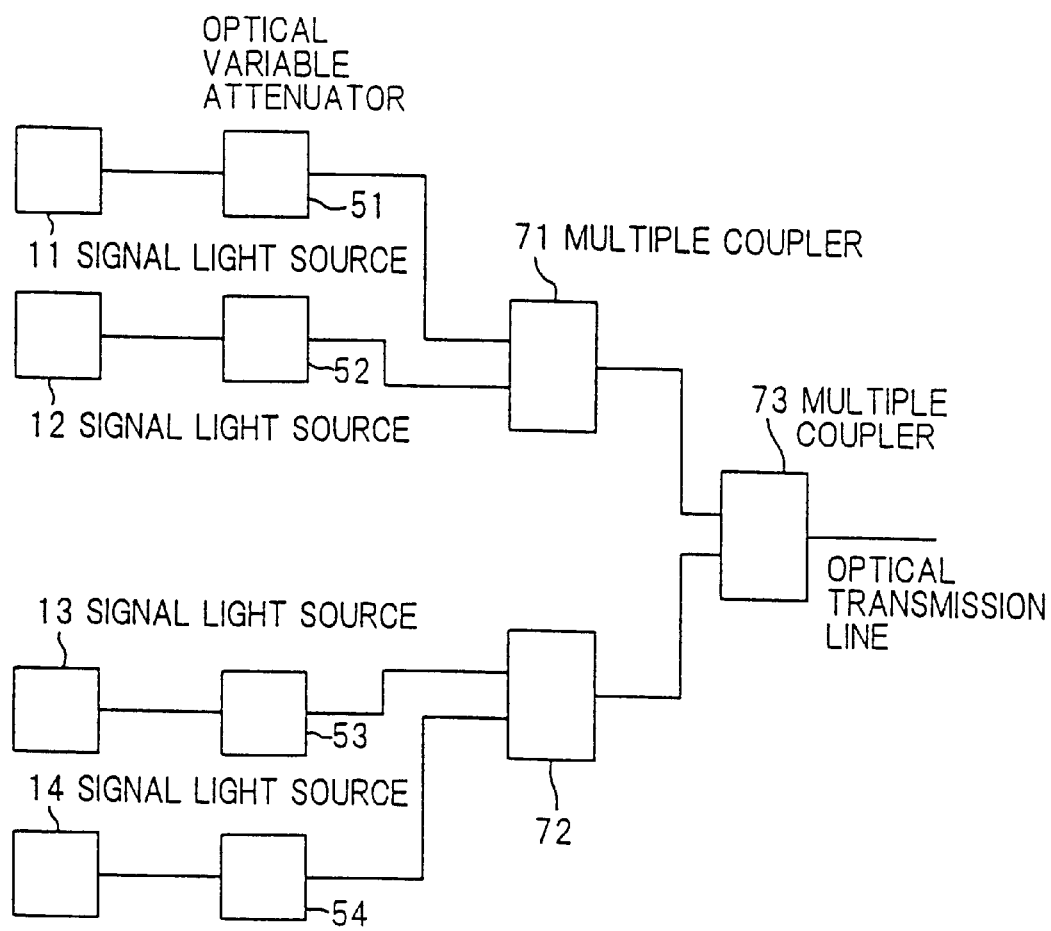
FIG. 2 shows another example of the conventional WDM optical communication systems.

(2) In a method shown in FIG. 2, optical variable attenuators 51 to 54 are respectively connected with the output ports of the signal light sources 22 to 24, and so adjusted that the optical signal levels are equalized at their output ports. Then, the outputs of the optical variable attenuators 51 to 54 by multiplexed by couplers 71 to 73.

Figure 3:
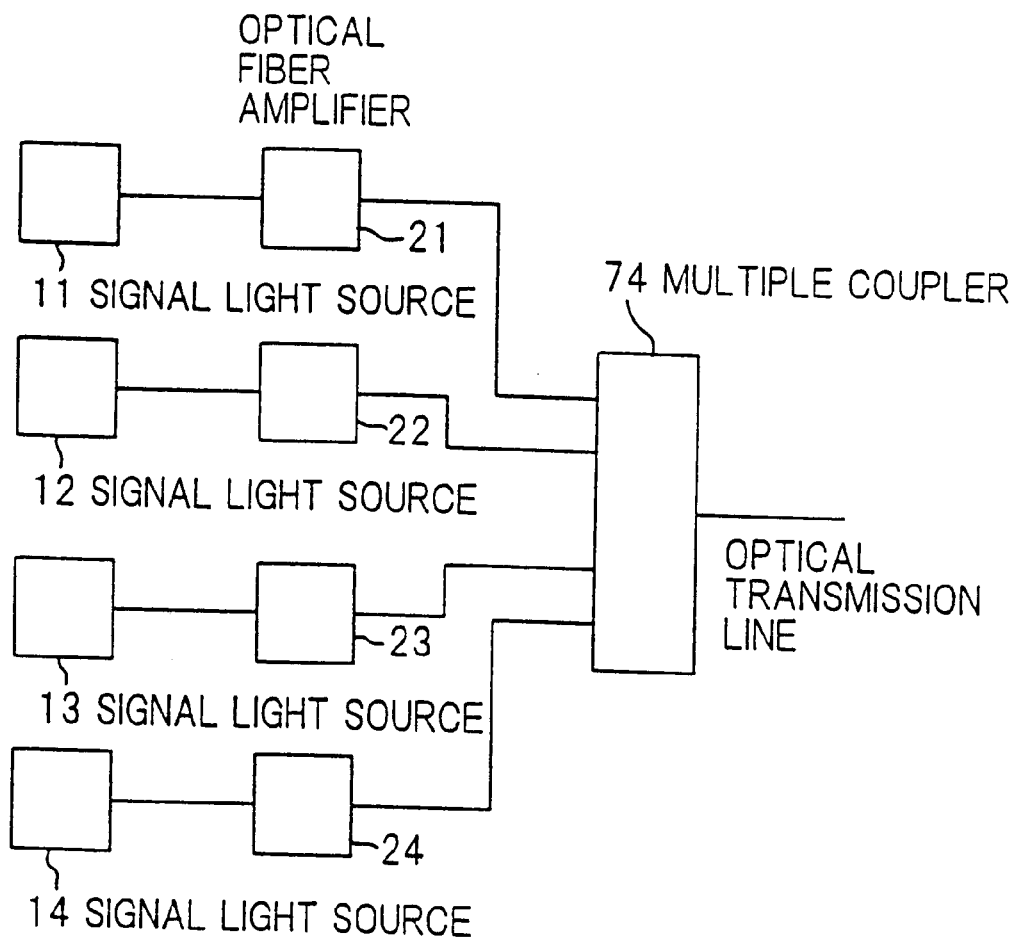
FIG. 3 shows the other example of the conventional WDM optical communication systems.

(3) In a method shown in FIG. 3, optical amplifiers, such as optical fiber amplifiers, 21 to 24 are respectively connected with the output ports of the signal light sources 11 to 14. The outputs of the optical amplifiers 21 to 24 are multiplexed by a coupler 74. The gains of the optical amplifiers 21 to 24 are respectively adjusted so that the levels of the optical signals are equalized at the output parts of the coupler 74.

However, in the methods shown in (1) and (2), the respective optical signal levels are adjusted based on the minimum level in them, so that high transmitting powers cannot be obtained. Moreover, in the method shown in (3), since each of the signal light sources is provided with the optical amplifier, the system is magnified and high-priced.

A similar problem arises in case that the WDM optical signals are collectively amplified by an optical fiber amplifier, and unevenness of the amplified optical signal levels caused by the wavelength dependency of the optical fiber amplifier is tried to be corrected.

Figure 4:
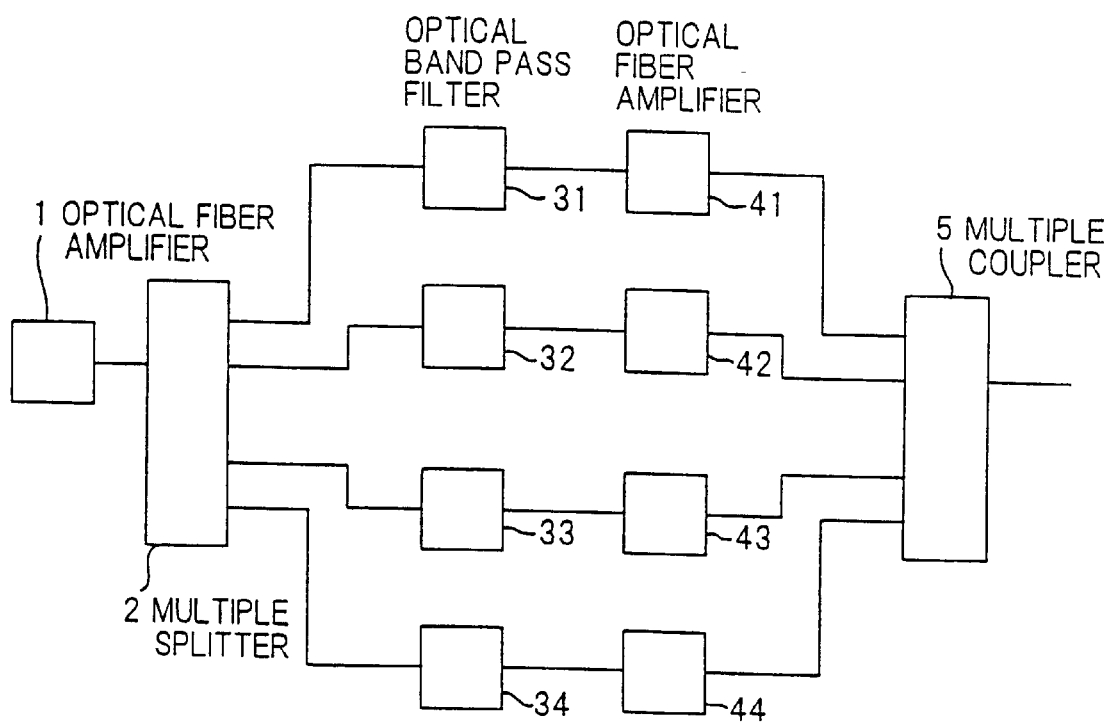
FIG. 4 shows a foundation of the preferred embodiments of the invention.
Figure 5:
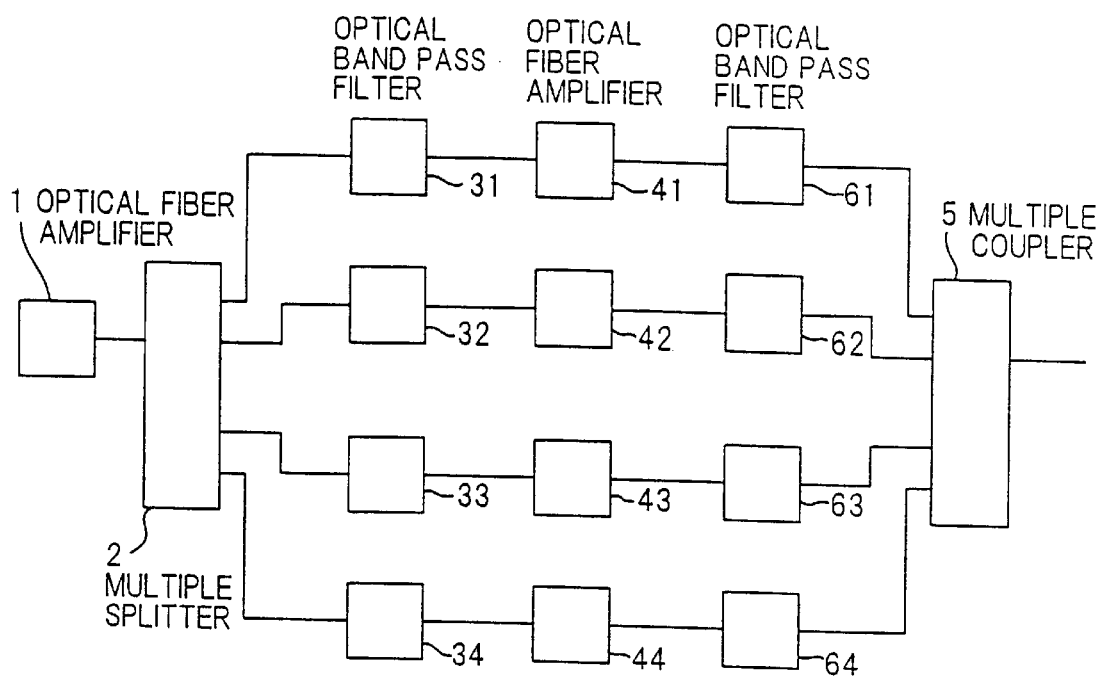
FIG. 5 shows another embodiment of the invention.
Figure 6:
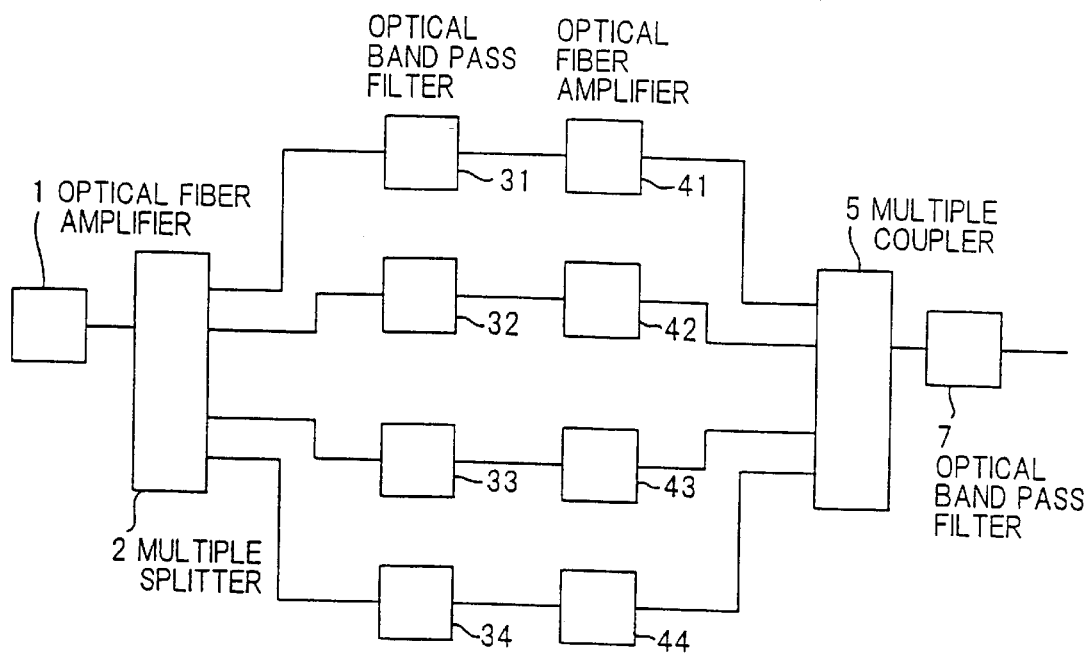
FIG. 6 shows the other embodiment of the invention.

FIGS. 4 to 6 respectively show preferred embodiments of the invention. The preferred embodiments will be explained for a case, where the number of optical signals to be multiplexed is eight.

FIG. 4 shows the first preferred embodiment of the invention, which is a foundation of other embodiment.

In this embodiments, the wavelengths of the eight input optical signals are respectively $\lambda 1$ to $\lambda 8$, where $\lambda 1 < \lambda 2 < \lambda 3 < \lambda 4 < \lambda 5 < \lambda 6 < \lambda 7 < \lambda 8$. An optical fiber amplifier 1 collectively amplifies the WDM optical signals with the multiplexed density of eight. A multiple splitter 2 splits the cutout of the optical fiber amplifier 1 into four groups of the WDM optical signals. Optical band pass filters 31 to 34 respectively pass the optical signals with the prescribed widths of the wavelengths. The outputs of the optical band pass filters 31 to 34 are respectively amplified by optical fiber amplifiers 41 to 44, the outputs of which are multiplexed by a multiple coupler 5.

Figure 9:
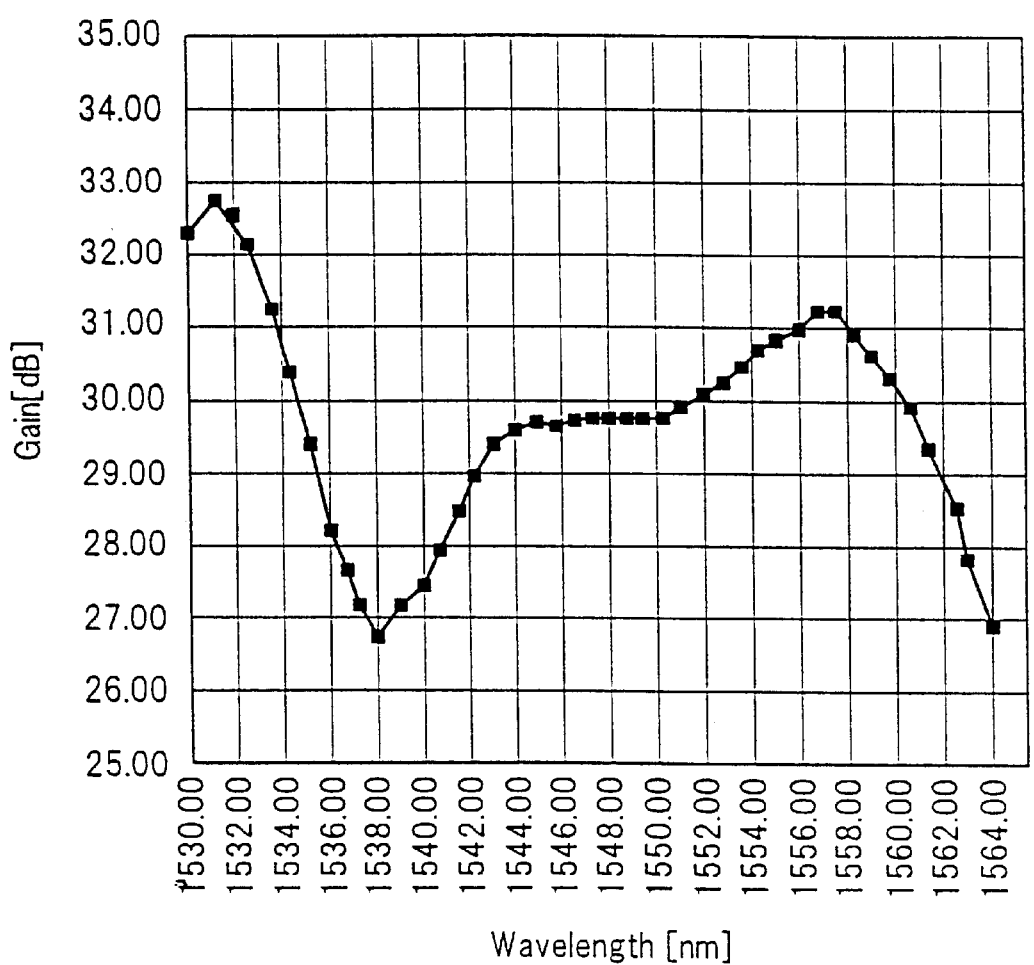
FIG. 9 shows an example of the wavelength dependency of the gain of the optical fiber amplifier 1.

As shown FIG. 9, the gain of the optical fiber amplifier 1 is not flat in general, when expressed as a function of the wavelength of the optical signal. Accordingly, when the plural optical signals are collectively amplified by the optical fiber amplifiers, the output levels of the optical signals are expressed as a function the wavelength of the optical signal in came that the spectrums of the input optical signals are flat.

In this embodiment, the WDM optical signals composed of the eight optical signals with the wavelengths $\lambda_1$ $\lambda_8$ are divided into the four groups of the optical signals with the prescribed band widths of the wavelengths, which are respectively amplified and adjusted by the four optical fiber amplifiers 41 to 44. In this way, the levels of the respective optical signals are equalized.

The multiple splatter 2 splits the WDM optical signals composed of the eight optical signals with the wavelengths of $\lambda_1$ to $\lambda_8$ into the four groups of the optical signals, which are respectively supplied to the optical band pass filter 31 to 34. Tho passing bands of the optical band pass filters 31 to 34 respectively correspond to isolated optical signals or plural optical signals with neighboring wavelengths, and the optical signals passing therethrough are respectively supplied to the optical fiber amplifiers 41 to 44. In the present example, since the number of the wavelengths of the optical signals is eight and that of the optical band pass filters in four, the numbers of the optical signals passing through the optical band pass filters are one to five.

In the system shown In FIG. 7, a fiber Bragg grating optical filter or a dielectric optical filter can be used as the optical band pass filter. The fiber Bragg grating optical filter is composed of the fiber Bragg grating, which reflects an optical signal with a particular wavelength, and an optical circulator, where the fiber Bragg grating is an optical fiber having a clad, a refractive index of which is expressed as a periodic function in the longitudinal direction. The dielectric optical filter is formed of $SiO_2$ or $MgO_2$.

Next, the gains of the optical fiber amplifiers 41 to 44 are respectively controlled, so that all the optical signals supplied to the optical fiber amplifiers show the same output levels. In other words, the output levels of the optical signals amplified by the optical fiber amplifiers become nearly the same by individually controlling the output levels of the respective optical fiber amplifiers 41 to 44. The optical fiber amplifiers 41 to 44 are formed of optical fiber having ores doped with small amount of rare earth metal, such as erbium, terbium or praseodymium. Moreover, a semiconductor optical amplifier can be adopted instead of the optical fiber amplifier. The wavelength dependencies of the gains of the optical fiber amplifies may equally have forms shown in FIG. 9. Or again, the aforementioned characteristic nay be flat in a desired wavelength range in conformity with the levels of the input optical signal levels or may have such a form that unevenness of the input optical signal levels can be canceled.

The outputs of the optical fiber amplifiers 42 to 44 are multiplexed by the coupler 5 and supplied to a single optical transmission line.

FIGS. 5 and 6 respectively show the other preferred embodiments of the invention. In addition to the system shown in FIG. 4, the systems shown in FIGS. 5 and 6 are respectively provided with the optical band filters for suppressing noises caused by spontaneous emission and improving the S/N ratios.

In the system shown in FIG. 5, the optical band pass filters 61 to 64 are respectively inserted between the optical fiber amplifiers 42 to 44 and the Multiple coupler 5.

In the system shown FIG. 6, an optical band pass filter 7 is connected with the output part of the multiple coupler 5.

Next, the embodiment of the invention will be explained concretely. FIG. 7 shows the structure of the embodiment, and the wavelengths $\lambda_1$ to $\lambda_8$ of the optical signals generated by the signal light sources are set as follows.

$\lambda_1$ : 1530 nm
$\lambda_2$ : 1536 nm
$\lambda_3$ : 1540 nm
$\lambda_4$ : 1545 nm
$\lambda_5$ : 1547 nm
$\lambda_6$ : 1549 nm
$\lambda_7$ : 1556 nm
$\lambda_8$ : 1558 nm In order to adjust the levels of the respective optical signals, the optical band pass filters are so adjusted that, the optical band pass filter 32 passes the optical signal of the wavelength $\lambda_1$, the optical band pass filter 32 passes the optical signals of the wavelengths of $\lambda_2$ and $\lambda_3$, the optical band pass filter 33 passes the optical signals of the wavelengths of $\lambda_4$, $\lambda_5$, and $\lambda_6$, and the optical band pass filter 34 passes the optical signals of the wavelength of $\lambda_7$ and $\lambda_8$. The level of the gross of the optical signals, which have passed the optical band pass filters, are separately adjusted by the optical fiber amplifiers and equalized as whole.

The passing band of the optical band pass filter 31, which passes the optical signal of the wavelength $\lambda_1$ is set to be 1530±2 nm. The passing band of the optical band pass filter 32, which passes the optical signals of the wavelengths of $\lambda_2$ and $\lambda_3$, is set to be 1535 to 1541 nm. The passing band of the optical band pass filter 33, which passes the optical signals of the wavelengths $\lambda_4$ to $\lambda_6$, is set to be 1544 to 1550 nm. The passing band of the optical band pass filter 34, which passes the optical signals of the wavelengths $\lambda_7$ and $\lambda_8$, is set to be 1555 to 1559 nm.

The gains of the optical fiber amplifiers 42 to 44, which respectively amplifies the outputs of the optical band pass filters 31 to 34, are controlled based on the wavelength dependency of the gain of the optical fiber amplifier shown in FIG. 9. All the optical fiber amplifiers comprise the optical fibers having the cores doped with erbium, rare earth metal, and the wavelength dependency of the gains of them are the same. The wavelengths of the plural optical signals to be amplified by the same optical fiber amplifier are so selected that the output signal levels are equalized in consideration of the wavelength dependent characteristic of the gain of the optical fiber amplifier shown in FIG. 9.

1×4 fiber fused couplers are used an the multiple splitter 2 and the multiple coupler 5. The optical band pass filters, which are respectively composed of the fiber Bragg gratings and the optical circulators, are used as the optical band pass filters 31 to 34.

The output power level of the optical fiber amplifier 1 and the gains of the optical fiber amplifiers 41 to 44 are respectively tabulated in table 1, and thereby the power levels of the output signals can be equalized.

TABLE 1

| WAVELENGTH (nm) | OUTPUT POWER OF OPTICAL FIBER AMPLIFIER (dBm) | GAIN OF OPTICAL FIBER AMPLIFIER 41–44 (dB) | OUTPUT POWER LEVEL (dBm) |
|---|---|---|---|
| λ1: 1530 | +12.8 dBm | +20.0 | 18.8 |
| λ2: 1536 | +8.0 dBm | +24.8 | 18.8 |
| λ3: 1540 | +8.0 dBm | +24.8 | 18.8 |
| λ4: 1545 | +9.8 dBm | +23.0 | 18.8 |
| λ5: 1547 | +9.8 dBm | +23.0 | 18.8 |
| λ6: 1549 | +9.8 dBm | +23.0 | 18.8 |
| λ7: 1556 | +11.2 dBm | +21.6 | 18.8 |
| λ8: 1558 | +11.2 dBm | +21.6 | 18.8 |

In this embodiment, as mentioned in the above, the optical signals with the different wavelengths are divided into several groups comprising isolated or neighboring optical signals by the four optical band pass filters, and the optical signals belonging to the same groups are separately amplified by the different optical fiber amplifiers 41 to 44 and multiplexed by the coupler 5. In this way, the output levels of the respective optical signals cam be equalized.

Figure 8:
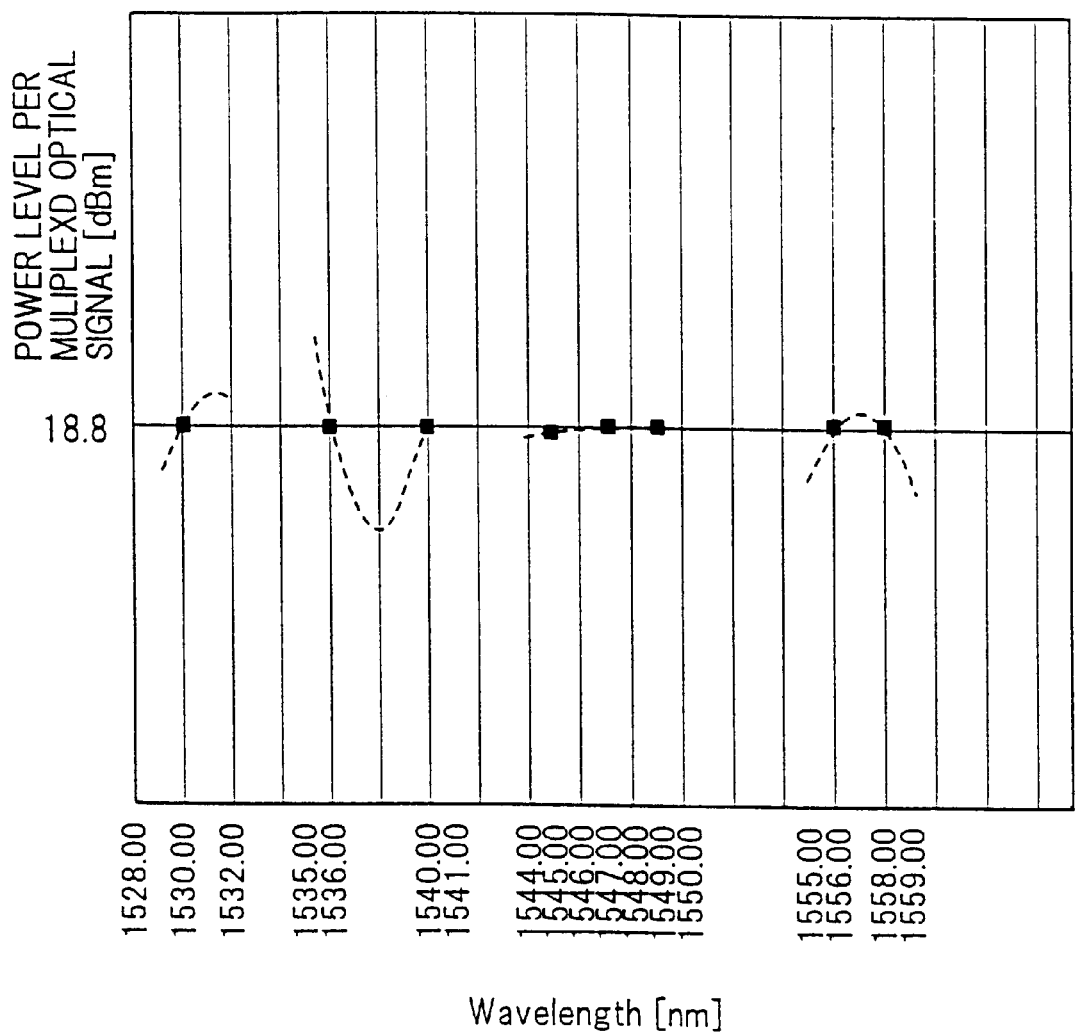
FIG. 8 shows numerical values of the output signal levels in the embodiment shown in FIG. 7 as a function of a wavelength of an optical signal.

FIG. 8 shows the levels of the optical signals (shown by black squares), which are obtained an the condition mentioned in the above, as a function of the wavelength of the optical signals. Curves shown by broken lines are added thereto for convenience of comprehension of the principle of the invention.

Figure 10:
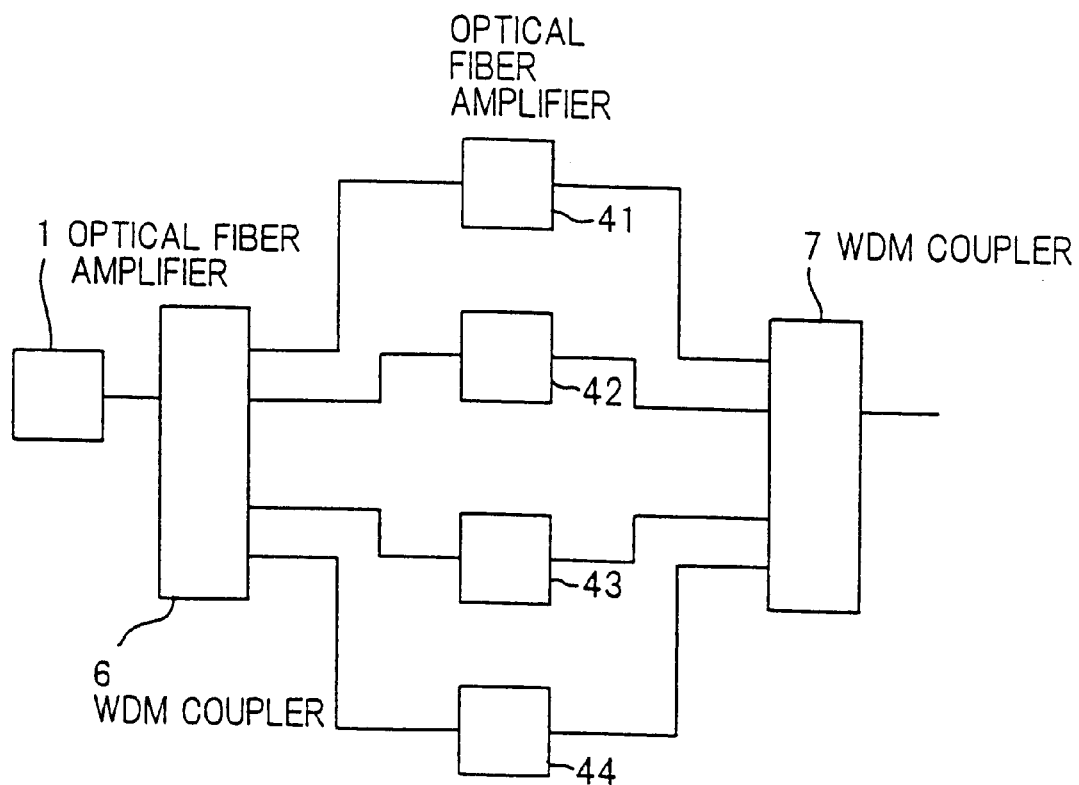
FIG. 10 shows a modification of the embodiment shown in FIG. 4.

A WDM coupler can be adopted as the multiple splitter 2 or the multiple coupler 5 instead of the fiber fused coupler, as shown in FIG. 10. Moreover, the dielectric optical filter can be adopted as a optical band pass filter instead of an optical filter composed of a fiber Bragg grating and an optical circulator. It should be noted that S/N ratios of the optical signals transmitted through the system shown in FIG. 10 can be improved by adding one or more optical band pass filters thereto similarly to the cases shown in FIGS. 5 and 6.

In this embodiment, it is advisable to allocate optical band pass filters nearby the multiple coupler in order to suppress spontaneously emitted lights from the optical fiber amplifiers. For example, in the system shown in FIG. 5, the output ports of the optical fiber amplifiers 41 to 44 are respectively connected with the optical band pass filters 61 to 64 having the same characteristics as those of the optical band pass filters 31 to 34, which suppress spontaneously emitted lights with the wavelengths lying in the outside of the passing bands of the optical band pass filters 61 to 64. In the system shown in FIG. 6, the output part of the multiple coupler 5 is connected with a optical band pass filter 7, which transmits a light having the wavelength λ1 to λ8 and suppresses undesired spontaneously emitted lights. Since both the aforementioned systems suppress the spontaneously emitted lights, they contribute to improvements of S/N ratios in the optical communication.

In the aforementioned embodiment of the invention, the number of the wavelengths of the optical signals is eight, and the optical signals are divided into several groups comprising isolated or neighboring optical signals by the four optical band pass filters. However, the numbers of the wavelengths and the optical band pass filters can be selected at will and combined with each other.

In the WDM optical communication system according to the invention, since the levels of the groups of the plural optical signals are respectively and collectively adjusted in order to make themselves uniform, the transmitting levels of the optical signals can be equalized by using the optical band pass filters and the optical fiber amplifiers, the numbers of which are respectively smaller than that of the optical signals, and can be increased up to the sufficiently high values.

Moreover, according to the invention, the optical fiber amplifier can be used for the optical communication even in a wavelength range, in which the wavelength dependency of its gain is not flat.

Accordingly, the number of the optical fiber amplifiers necessary for adjusting the levels of the optical signals can be decreased, so that the system can be small-sized and low-priced, and the WDM optical communication over a wide rang of the wavelength becomes practical.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A wavelength division multiplexed (WDM) communication system comprising:
a first stage optical amplifier for collectively amplifying WDM optical signals;
means for demulitplexing an output of said first stage optical amplifier into plural groups of one or more optical signals, said plural groups of optical signals having varying power levels;
a first plurality of optical band pass filters comprising one of fiber Bragg grating optical filters and dielectric optical filters, for filtering said plural groups of one or more optical signals;
plural second stage optical amplifiers for respectively amplifying said plural groups of one or more optical signals with a gain such that each of said plural groups has a same power level;
a second plurality of optical band pass filters comprising one of fiber Bragg gratings, optical filters and dielectric optical filters for filtering said plural groups of one or more optical signals output from said plural second stage optical amplifiers; and
means for multiplexing outputs of said second plurality of optical band pass filters.

2. A WDM optical communication system according to claim 1, wherein said means for demultiplexing said output of said first stage optical amplifier comprises a first WDM coupler.

3. A WDM optical communication system according to claim 1 wherein said means for multiplexing comprises a WDM coupler.

4. A WDM optical communication system according to claim 1, wherein said means for demultiplexing said output of said first stage optical amplifier comprises a multiple optical splitter.

5. A WDM optical communication system according to claim 1, wherein said first and second stage optical amplifiers are respectively optical fiber amplifiers comprising optical fibers provided with cores doped with rare earth metal.

6. A wavelength division (WDM) communication system for equalizing power levels of optical signals, comprising:
an input optical fiber carrying a plurality of WDM optical signals;
a multiple splitter for spitting said WDM optical signals into a plurality of optical signals at various power levels;

a first plurality of optical band pass filters comprising one of fiber Bragg grating optical filters and dielectric optical filters, for filtering said plural of optical signals;

a plurality of optical power amplifiers for multiplying each of said plurality of optical signals by a gain, wherein the gain causes an output of each of said optical power amplifiers to have a same power level;

a second plurality of optical band pass filters comprising one of fiber Bragg grating optical filters and dielectric optical filters for filtering said plural groups of one or more optical signals output from said plurality of optical power amplifiers; and a multiple coupler for combining said output of each of said optical power amplifiers onto an output optical fiber.

7. A wavelength division multiplex (WDM) communication system for equalizing power levels of optical signals as recited in claim 6 wherein said plurality of optical power amplifiers comprise an optical fiber doped with rare earth metal selected from the group consisting of erbium, terbium, and praseodymium.

* * * * *